C. SPIERLING.
BEEHIVE.
APPLICATION FILED JULY 22, 1909.

980,691.

Patented Jan. 3, 1911.
2 SHEETS—SHEET 1.

Witnesses:
T. J. Morgan, Jr.
Thomas J. Morgan

Inventor
Charles Spierling
By Morgan & Rubinstein
Att'ys.

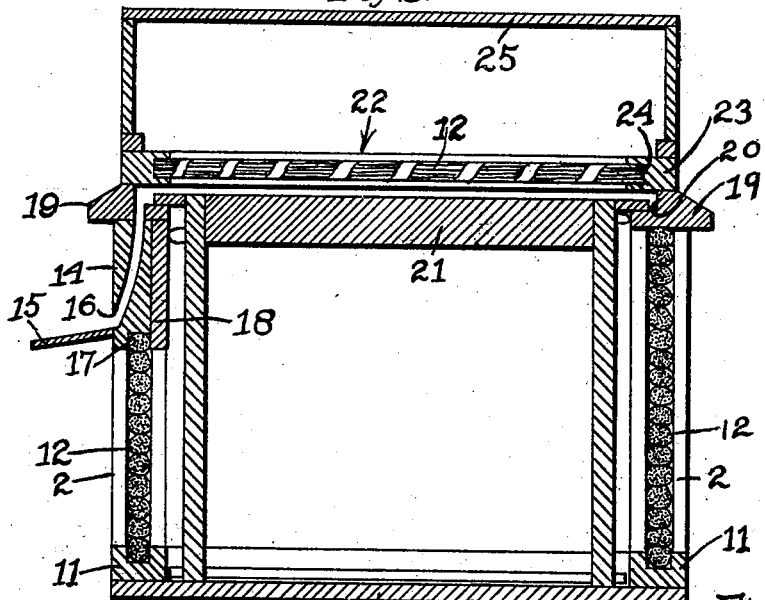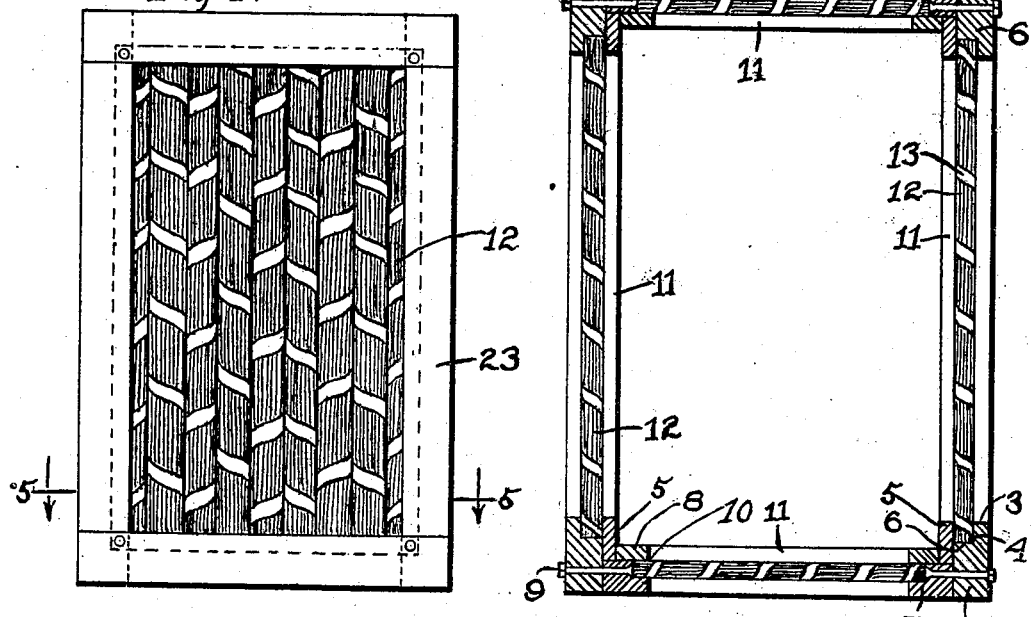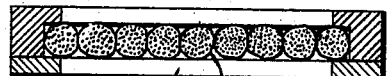

UNITED STATES PATENT OFFICE.

CHARLES SPIERLING, OF DALTON, ILLINOIS.

BEEHIVE.

980,691.

Specification of Letters Patent.    Patented Jan. 3, 1911.

Application filed July 22, 1909.   Serial No. 509,048.

*To all whom it may concern:*

Be it known that I, CHARLES SPIERLING, a citizen of the United States, residing at Dalton, in the county of Cook and State of Illinois, have invented a new and useful Improvement in Beehives, of which the following is a specification.

The object of my invention is to so construct the body of the hive as to maintain a lower temperature in the interior than outside in summer and warmer in the winter; that will provide a drier interior; better ventilation and more healthful inclosure for bees and exclusion of moths.

Figure 1:
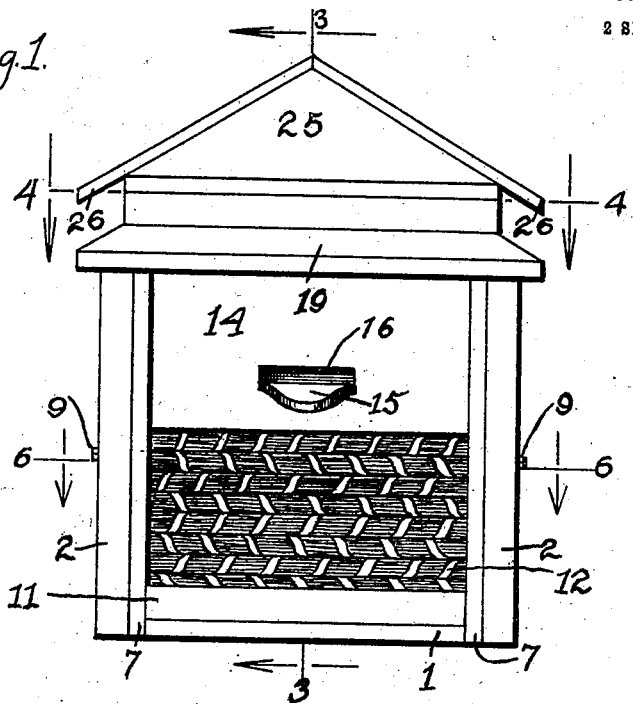
Figure 2:
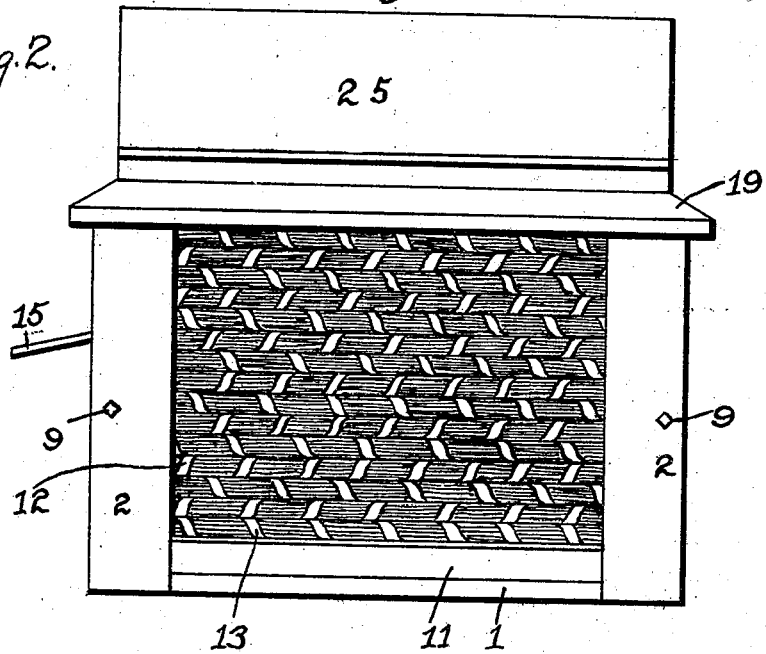

The manner in which I accomplish my object is described in the following specification and illustrated in the accompanying drawings in which:

Figure 1 is a front elevation. Fig. 2 is a right side elevation. Fig. 3 is a central vertical section on the line 3—3 Fig. 1. Fig. 4 is a plan view on the line 4—4 Fig. 1. Fig. 5 is a cross section on the line 5—5 Fig. 4, and Fig. 6 is a cross section on the line 6—6 Fig. 1.

In the drawings 1 is the bottom of the hive. Checked into the corners of this bottom are four corner posts 2, shown in section in Fig. 6. The inside face 3, of each of these posts is cut down as shown at 4, and a strip 5, is secured on the inside to form a channel 6, in which the wall of the hive hereinafter described is supported. Secured to each of these posts is a recessed portion 7. To each of these portions a strip 8 is secured by the bolts 9, forming a vertical channel 10, identical with the channels in the posts. Fixed to the bottom 1, between the posts 2, and portions 7, are channeled rails 11, shown in section in Fig. 3. Secured in the channels of the parts 2 and 7 are bundles of rye straw 12. Each of these bundles is firmly bound by cane strips 13. The several bundles are placed horizontally one above the other in the vertical channels and are pressed together, thereby forming the walls of the hive at the sides, rear and lower portion of the front. The upper part 14 of the front wall is of wood, constructed with a projecting shelf 15, and an aperture 16. This aperture extends upward in the body of the wood into the upper interior of the hive as shown in Fig. 3. The bottom edge 17, of the part 14, is recessed to form a channel which is completed by the inside piece 18 which is secured to the part 14, as shown in Fig. 3. Secured on the top of the walls and posts is a projecting frame 19. This frame is shouldered on the inside 20, to support the interior removable frames 21, one of which is shown in Fig. 3. Removably secured on the frame 19, by dowel pins or other means, is a roof 22. This roof consists of a frame 23, of several parts forming an inside channel 24, shown in Fig. 5, in which bundles of straw are secured, in the same manner as are the walls.

When the hives are located in a building or under other cover so that the rain and snow cannot fall upon the roof, then the structure as described is complete, but when located outside and exposed to the weather, then an additional cover 25, is placed over the straw roof. This cover forms a close connection with the ends of the frame 23, but is spaced from the sides for free circulation of the air over and through the roof which is protected by the overhang 26 of the cover 25 shown in Fig. 1, under which the air is free to pass over the roof.

What I claim and desire to secure by Letters Patent is:

In a bee hive consisting of a base plate, side and end rails fixed thereon, the upper edges thereof channeled to hold bound bundles of straw, corner posts fixed on said base, the two inside edges of each post being channeled from end to end to hold the ends of bound bundles of straw, bound bundles of straw horizontally inserted in the channels of said posts, and thereby forming the walls of said hive, the lower bundle of straw in each wall being held in the channel of said base rail, a vertical plate slidably inserted in the channels of said posts adapted to form the top part of one of said walls, said plate having an interior vertical passage way extending through the lower part of said plate, and through the top edge for the passage of bees, a frame fixed on the top of said posts, said frame being shouldered on the inside to support removable inside frames, and having a vertical aperture adapted to register with the passage way in said vertical plate, and beveled outer edges extending beyond said walls to shed rain water therefrom, a second frame adapted to rest on said fixed frame, the inner edges of the second frame being channeled to hold bound bundles of straw, bound bundles of straw secured horizontally in said frame, and a gable roof supported on said frame.

CHARLES SPIERLING.

Witnesses:
 THOMAS J. MORGAN,
 JULIUS RUBINSTEIN.